(12) United States Patent
Janarthanan et al.

(10) Patent No.: US 10,887,207 B2
(45) Date of Patent: Jan. 5, 2021

(54) SYSTEM AND METHOD FOR DETERMINING BRANCH GATEWAY DEVICE AVAILABILITY IN COMPUTER NETWORKS

(71) Applicant: HEWLETT PACKARD ENTERPRISE DEVELOPMENT LP, Houston, TX (US)

(72) Inventors: Kameshwaran Janarthanan, Tamil Nadu (IN); Hariharan Nagarajan, Tamil Nadu (IN); Vimal Dinakaran, Tamil Nadu (IN); Yogeswaran Thulasidoss, Tamil Nadu (IN); Thiyagarajan Rajendran, Tamil Nadu (IN); Srihari Venkiteswaran, Tamil Nadu (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/172,934

(22) Filed: Oct. 29, 2018

(65) Prior Publication Data
US 2020/0136946 A1 Apr. 30, 2020

(51) Int. Cl.
*H04L 12/26* (2006.01)
*H04L 12/66* (2006.01)
(Continued)

(52) U.S. Cl.
CPC .......... *H04L 43/0817* (2013.01); *H04L 12/66* (2013.01); *H04L 43/04* (2013.01);
(Continued)

(58) Field of Classification Search
CPC ..... H04L 67/10; H04L 67/1095; H04L 67/02; H04L 67/1097; H04L 67/42; H04L 69/40;
(Continued)

(56) References Cited

U.S. PATENT DOCUMENTS

2004/0085894 A1* 5/2004 Wang ................ H04L 41/0663
370/216
2012/0158976 A1 6/2012 Van der Merwe et al.
(Continued)

FOREIGN PATENT DOCUMENTS

WO WO-2008029314 3/2008

OTHER PUBLICATIONS

Maximizing Availability in the Branch with Integrated Services Routers, (Web Page), Aug. 8, 2017, 15 Pgs., https://www.cisco.com/c/en/us/products/collateral/routers/1800-series-integrated-services-routers-isr/prod_white_paper0900aecd805bbf96.html.
(Continued)

*Primary Examiner* — Chirag R Patel
(74) *Attorney, Agent, or Firm* — Nolte Intellectual Property Law Group

(57) ABSTRACT

The present disclosure provides an effective solution to accurately determine branch gateway device availability within a computer network. The present disclosure can be employed to accurately determine branch gateway device availability when branch gateway devices are configured in a high-availability peer configuration state and managed by a cloud management service. In some implementations, when branch gateway devices are in a high-availability peer configuration state, they send status messages to their peers which in turn can forward to a cloud management service such that the availability of each branch gateway device on a network can be readily obtained.

19 Claims, 5 Drawing Sheets

(51) Int. Cl.
  *H04L 12/703* (2013.01)
  *H04L 12/707* (2013.01)
  *H04L 12/751* (2013.01)

(52) U.S. Cl.
  CPC ............ *H04L 43/10* (2013.01); *H04L 45/026* (2013.01); *H04L 45/22* (2013.01); *H04L 45/28* (2013.01)

(58) Field of Classification Search
  CPC ......... H04L 43/04; H04L 43/16; H04L 43/18; G06F 11/2048; G06F 11/2035
  See application file for complete search history.

(56) References Cited

U.S. PATENT DOCUMENTS

| | | |
|---|---|---|
| 2013/0042323 A1 | 2/2013 | Narayanaswamy et al. |
| 2016/0112350 A1 | 4/2016 | Morrison et al. |
| 2016/0277509 A1* | 9/2016 | Qiang ................... H04L 67/16 |
| 2017/0308446 A1* | 10/2017 | Kanso ................ G06F 11/0757 |
| 2018/0302807 A1* | 10/2018 | Chen ...................... H04L 45/22 |
| 2019/0173780 A1* | 6/2019 | Hira ....................... H04L 45/22 |
| 2019/0196921 A1* | 6/2019 | Verkaik ............... G06F 11/2028 |

OTHER PUBLICATIONS

Configuring High Availability, (Web Page), Retrieved, Jun. 6, 2018 17 pages https://support.riverbed.com/bin/support/static/drr5abac55gjf3t2oukprib2p/html/3g9d2i72jnt89410rhhtirnc5h/sc_ua_html/index.html#page/sc_ug/ha.html.

\* cited by examiner

FIGURE 3

| Availability Chart | TS1 303 | TS2 304 | TS3 305 | TSX |
|---|---|---|---|---|
| GW1-Circuits 301 | ✓ | ✓ | ✓ | |
| GW2-Circuits 302 | ✓ | ✓ | ✓ | |

300

SYSTEM AND METHOD FOR DETERMINING BRANCH GATEWAY DEVICE AVAILABILITY IN COMPUTER NETWORKS

BACKGROUND

Branch gateway devices are generally used within a computer network as a hardware device that functions as a gate between two or more computer networks. In some instances, branch gateway devices are connected to one or more network devices (e.g., branch devices) so that the branch gateway devices can send status messages to a cloud management service.

Branch gateway devices can be configured with redundancy peers to support high availability and may be managed by a cloud service that provides monitoring, reporting, and configuration services. In some systems, branch gateway devices periodically send notifications in the form of keep-alive messages to a cloud service to communicate the branch gateway devices' service availability.

There are situations, however, where keep-alive messages may not be timely received by a cloud service. For example, a computer network may be lossy in certain areas which causes keep-alive packets to be lost. There may also be infrastructure malfunctions (e.g., receiver failures) which may lead to packet loss. In addition, congested networks may delay packet transmission to a cloud service.

To solve these problems, some solutions have employed probing or polling of unresponsive network devices in the event that status messages from these devices are not timely received. Other systems have employed periodic-state syncs between the cloud service and the managed network devices. Unfortunately, these solutions have not been effective in production environments.

Therefore, a need exists for a solution to effectively determine branch gateway device availability.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which:

FIG. 3 is a table which shows the availability of branch gateway devices to the cloud-enabled management system;

DETAILED DESCRIPTION

The description of the different advantageous implementations has been presented for purposes of illustration and is not intended to be exhaustive or limited to the implementations in the form disclosed. Many modifications and variations will be apparent to those of ordinary skill in the art. Further, different advantageous implementations may provide different advantages as compared to other advantageous implementations. The implementation or implementations selected are chosen and described in order to best explain the principles of the implementations, the practical application, and to enable others of ordinary skill in the art to understand the disclosure for various implementations with various modifications as are suited to the particular use contemplated.

Before the present disclosure is described in detail, it is to be understood that, unless otherwise indicated, this disclosure is not limited to specific procedures or articles, whether described or not. It is further to be understood that the terminology used herein is for the purpose of describing particular implementations only and is not intended to limit the scope of the present disclosure.

It must be noted that as used herein, and in the claims, the singular forms "a," and "the" include plural referents unless the context clearly dictates otherwise.

Figure 1:
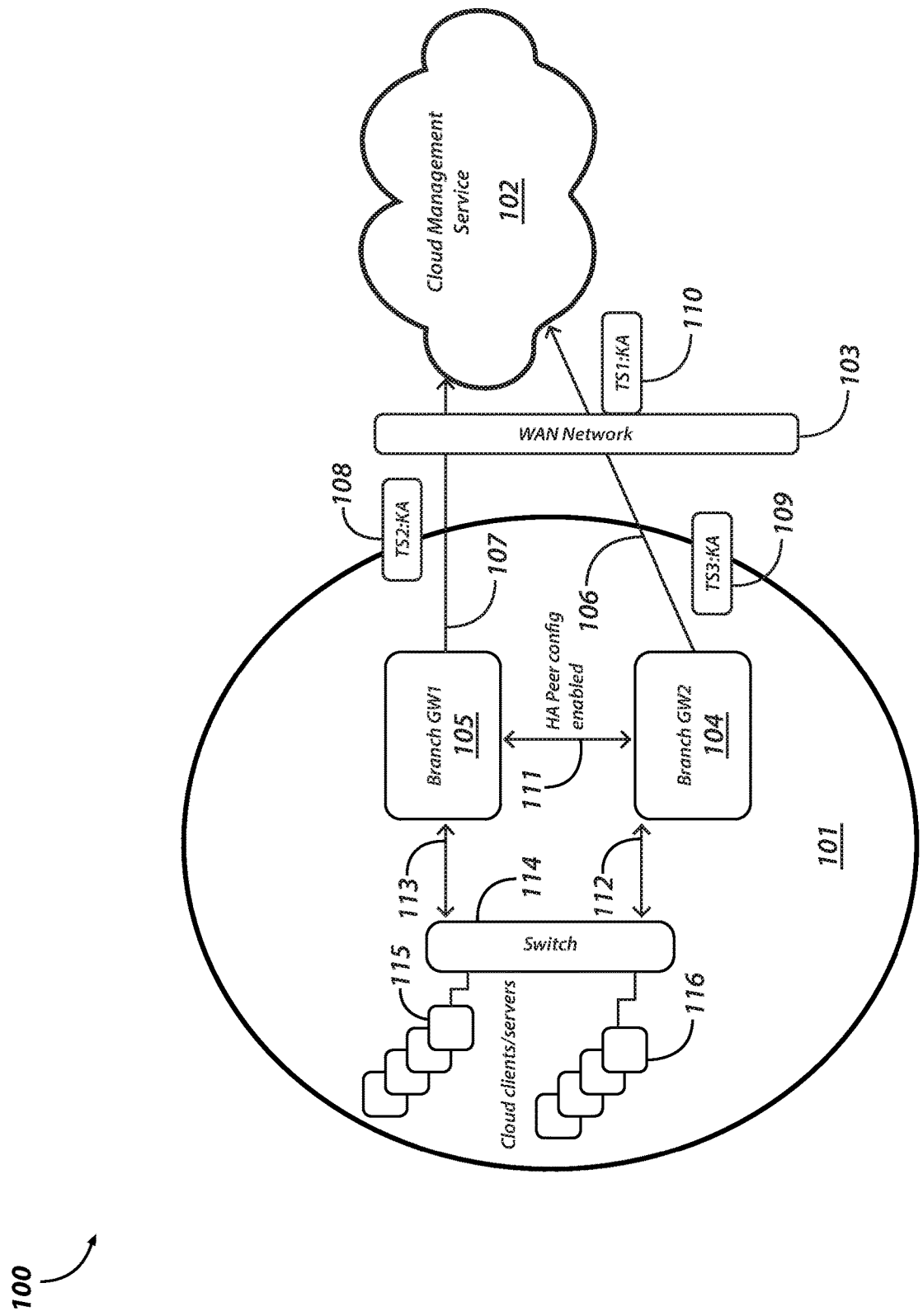
FIG. 1 is an illustration of a cloud-enabled management system consistent with one implementation of the present disclosure.

FIG. 1 is an illustration of a cloud-enabled management network system 100 consistent with one implementation of the present disclosure. Cloud-enabled management network system 100 includes one or more computer networks 101 with branch gateway devices 104, 105 managed by a cloud management service 102. Cloud-enabled management network system 100 may be hosted by a plurality of data hosting services (e.g., cloud platforms). The cloud-enabled management network system 100 may include a workstation, one or more processors, and computer memory.

Cloud management service 102 can offer a central point of management and control for all access points (APs), routers, controllers, switches, branch gateway devices, and head-end gateways. Cloud management service 102 also provides remote monitoring and troubleshooting, central configuration and firmware management, as well as compliance record and historical data retention.

In this disclosure, a branch gateway device is defined as a hardware device that functions as a gate to control data transmissions between two or more computer networks. A branch gateway device can function as a data communication device to provide a remote network with connectivity to a host network. In addition, a branch gateway device can regulate the traffic between two or more dissimilar networks.

In some implementations, a branch gateway device is a network appliance that connects to Wide Area Network (WAN) 103 via uplinks. A branch gateway device may also provide firewall protection, web content classification, hybrid WAN connectivity, Internet Protocol Security Virtual Private Network (IPsec VPN), Quality of Service (QoS), and Wide Area Network (WAN) path monitoring and selection. In some implementations, a branch gateway device may function as a policy enforcement point for wired, wireless, security, and WAN policies.

Referring back to FIG. 1, branch gateway devices 104, 105 may be connected and provide access to or may be the gateway for other devices of cloud-enabled management network system 100 such as, but not limited to, switches, routers, other network gateways, or client devices. In the implementation shown, branch devices 115, 116 are connected to switch 114, which are connected to other branch devices 115, 116 via one or more network links 112, 113.

In the implementation shown in FIG. 1, cloud management service 102 can manage and track the service availability of each branch gateway device 104, 105 on the network 101.

Branch gateway device 104, 105 can include physical and virtual circuits. In one implementation, each branch gateway device 104, 105 has two physical circuits and two virtual circuits. However, one having ordinary skill in the art should appreciate that the present disclosure is not limited thereto. The physical and virtual circuits may be referred to as uplinks. In this disclosure, an uplink is defined as a device used to connect one network to a larger network (e.g., WLAN) or to a "higher level device" in a computer network topology.

For example, branch gateway device 104 may be given access to a broadband network service whereas branch gateway device 105 may be given access to a Multiprotocol Label Switching (MPLS) network service. In this implementation, the physical uplinks for the branch gateway device 104 comprises the physical access circuitry to the broadband network service and the physical uplinks for the branch gateway device 105 comprise the physical access circuitry to the MPLS network service. In this implementation, the virtual uplinks for the branch gateway devices 104 comprise software access to the MPLS network service whereas the virtual uplinks for the branch gateway device 105 comprise software access to the broadband network service.

Branch gateway devices 104, 105 can send status messages regarding its device availability to cloud management service 102. Availability may refer to a branch gateway device's circuit or service functionality. For example, a status message that includes a branch gateway device's service availability may inform as to whether the branch gateway network device can process certain tasks or process any tasks at all.

Branch gateway devices 104, 105 can send status messages regarding a branch gateway device's service availability in the form of keep-alive messages 108, 109, 110 to the cloud management service 102 along network paths 106, 107. Keep-alive messages herein are messages that include information regarding the branch gateway device's uplink availability, infrastructure availability, and information as to whether a branch gateway device is in a high-availability peer configuration state (communications link 111). Each keep-alive message may be time-stamped according to the time that it is transmitted from a branch gateway device. In some implementations, a branch gateway device transmits a keep-alive message every five seconds.

As discussed, the branch gateway devices 104, 105 may be configured in a high-availability (HA) peer configuration state. Herein, a high-availability peer configuration state is defined as a device or system that is continuously operational for a sustained period of time. In some implementations, a high-availability peer configuration state employs redundant components to accommodate for failures. As such, in the case of a failure by a branch gateway device that is presently in a high-availability peer configuration state, a peer branch gateway device can communicate its service availability and the service availability of the unavailable peer branch gateway device to a cloud management service 102.

In some implementations, a high-availability peer configuration state may include two branch gateway devices. However, the present disclosure is not limited thereto. High-availability peer configuration state may include two or more peer devices.

In some implementations, a branch gateway device's circuit availability may be transmitted back to a keep-alive message. For example, a branch gateway device may generate a keep-alive message with information regarding its infrastructure availability. The keep-alive message may be appended with information pertaining to the availability of the branch gateway device's uplinks and further transmitted to the cloud management service 102.

In addition, a peer branch gateway device can receive data or network traffic intended to be routed to a failed branch gateway device according to instructions given by the cloud management service 102.

When branch gateway devices 104, 105 are in a high-availability peer configuration state, a branch gateway device can send keep-alive messages or receive data or other network traffic originally intended for a peer gateway device. In one implementation of the present disclosure, each peer gateway device sends keep-alive messages on behalf of its peer to the cloud management service 102 at a certain rate. However, the keep-alive message transmitted to a peer device may be sent at a different rate than the rate that the branch gateway devices 104, 105 send keep-alive messages regarding its service availability to the cloud management service 102.

Further, there may be external factors which may affect the rate that keep-alive messages are sent to the cloud management system 102 and a peer device. For example, in the case of livestreaming, keep-alive messages may be generated and sent to the cloud management service 102 at a greater rate than when livestreaming is disabled.

In some implementations, a branch gateway device 105 may be in a high-availability peer configuration state with a branch gateway device 104. As such, if a branch gateway device 105 is unavailable and cannot send periodic keep-alive messages to the cloud management service 102, a peer gateway device can send keep-alive messages to the cloud management service 102 on its behalf and also receive data or other network traffic that is intended for the unavailable branch gateway device.

In some scenarios, a branch gateway device 104, 105 may be unavailable due to an impairment in the branch gateway device's 104 infrastructure. However, the branch gateway devices 104, 105 may include bypass circuits such that network requests are not delayed from processing by the cloud management service 102.

The present disclosure may be implemented for branch gateway devices that are peer enabled within the same branch or for branch gateway devices that are in different branch gateway devices.

Figure 2:
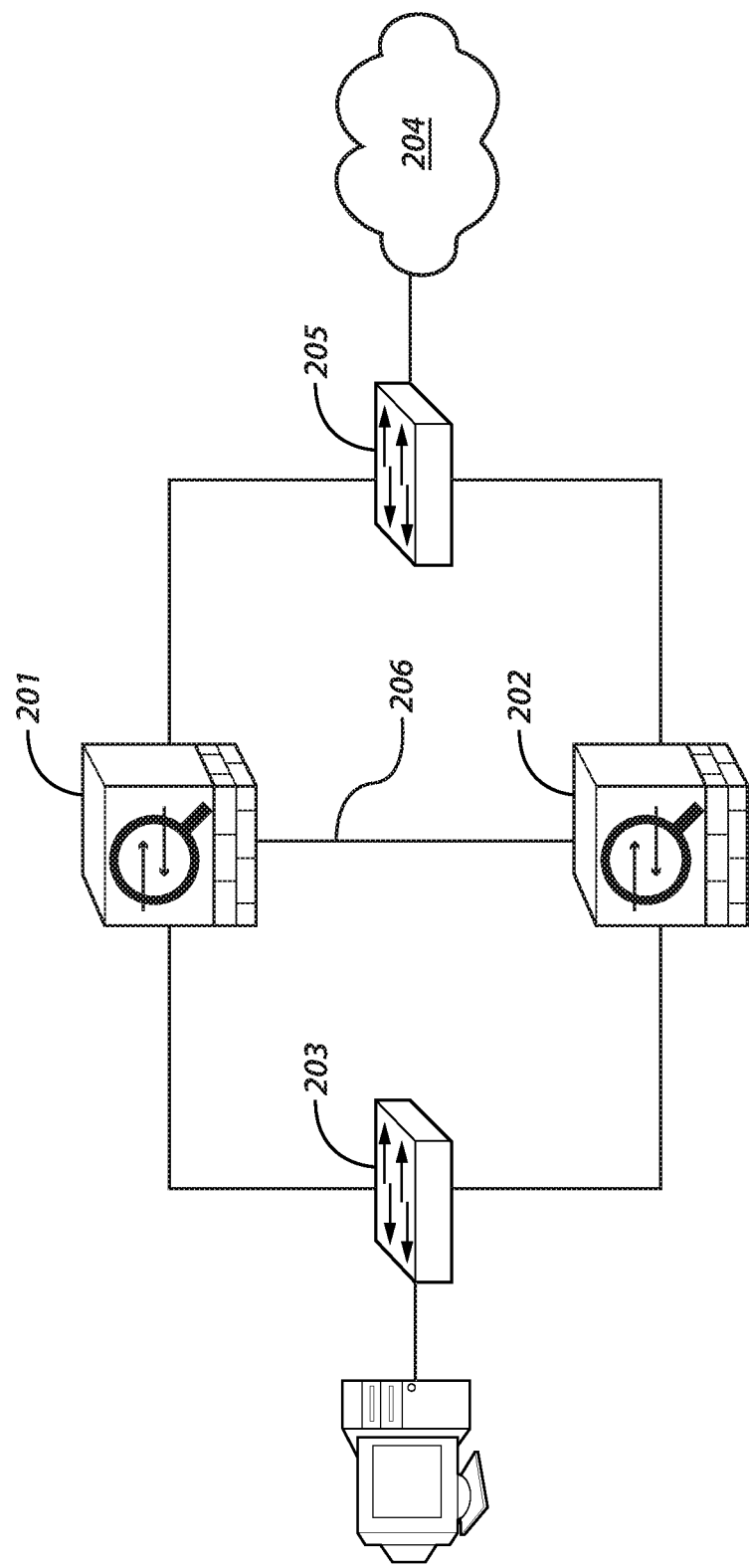
FIG. 2 is an illustration of branch gateway devices in a high-availability configuration state.

FIG. 2 is an illustration of branch gateway devices 201, 202 in a high-availability configuration state (communications link 206). As shown, branch gateway devices 201, 202 are on a network with switches 203, 205 connected to the internet 204. In some implementations, branch gateway devices 201, 202 provide firewall protection. Advantageously, branch gateway devices 201, 202 can be configured to operate in an active or standby failover mode. For example, branch gateway device 201 may be the primary unit whereas branch gateway device 202 can be a secondary unit of the high-availability pair. Communications link 206 can propagate communications (e.g., keep-alive messages) between the branch gateway devices 201, 202 regarding their failover status, synchronizing configuration/commands, etcetera.

FIG. 3 is a table 300 which shows the availability of branch gateway devices to the cloud-enabled management system. Table 300 includes branch gateway devices GW1 301, GW2 302 and their availability to send keep-alive messages (e.g., time stamps TS1 303, TS2 304, TS3 305, TSX, etc.). The time stamps that keep alive messages are sent may be on the order of milliseconds, seconds, minutes, etcetera. In one implementation, keep-alive messages are sent every five seconds such that if a first keep-alive message is sent at 10:00 am (TS1 303), the next keep-alive messages are sent at 10:05 am (TS2 304) and 10:10 am (TS3 305).

Figure 4:
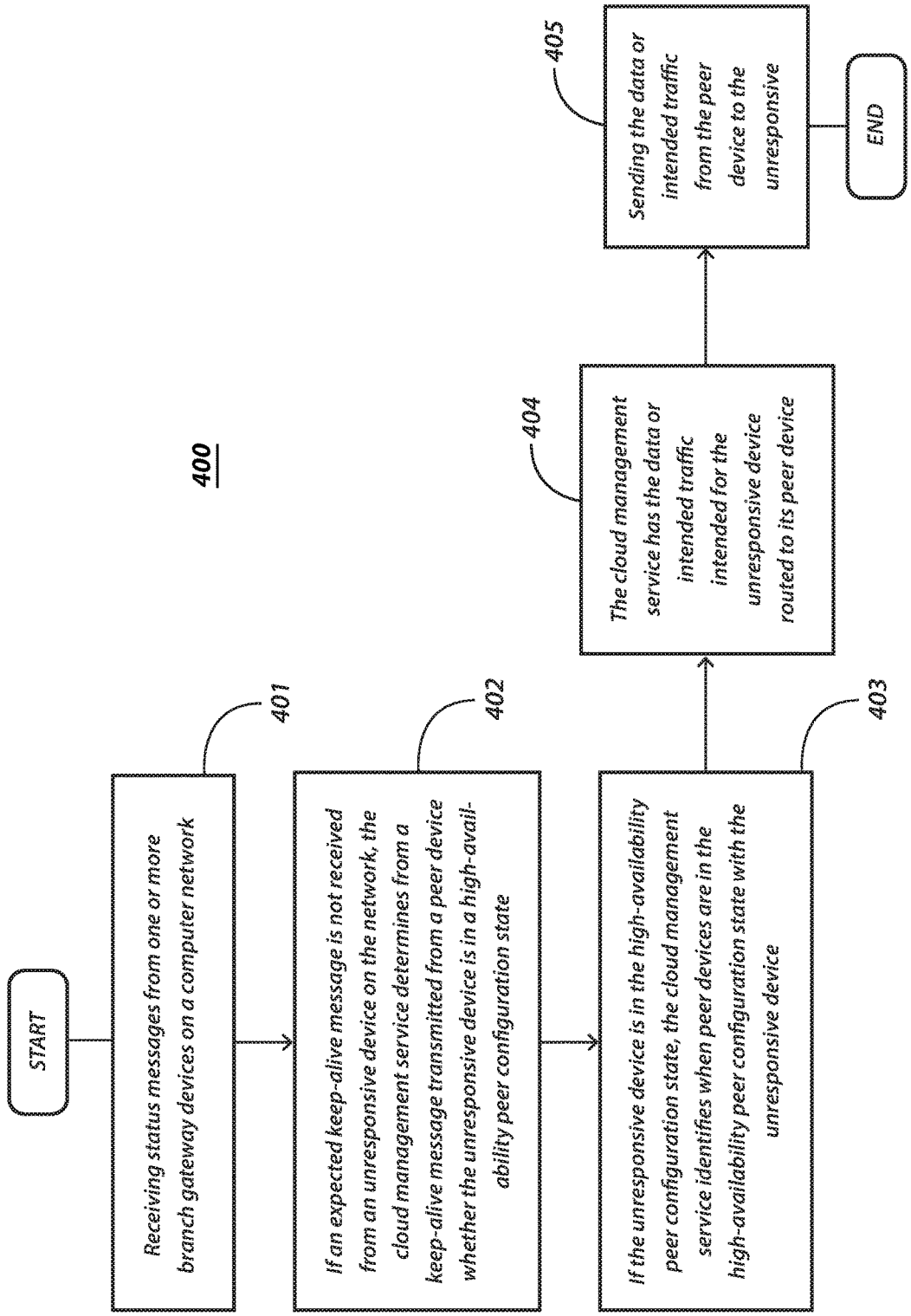
FIG. 4 is a flowchart of a method for determining branch gateway device circuit and device availability in a computer network.

FIG. 4 is a flowchart 400 of a method for determining branch gateway circuit and device availability in a computer network. The method begins with receiving status messages from one or more branch gateway devices on a computer network (block 401). The status messages may include information regarding the branch gateway device's availability. In some implementations, the status messages can be sent in the form of keep-alive messages. The status messages may be received by a cloud management service which comprises servers and other cloud devices known in the art. In addition, each branch gateway device can send updates at a pre-determined rate depending upon a schedule determined by the cloud management service.

Next, if an expected keep-alive message is not received from an unresponsive device on the network, the cloud management service determines from a keep-alive message transmitted from a peer device whether the unresponsive device is in a high-availability peer configuration state (block 402). In addition, in some implementations of the disclosure, if an expected status message is not received, the cloud management service issues an alert to an administrator to inform of the unavailability status of the branch gateway device.

Further, if the unresponsive device is in the high-availability peer configuration state, the cloud management service identifies when peer devices are in the high-availability peer configuration state with the unresponsive device (block 403). In some implementations, the cloud management service obtains information about the peer device from a keep-alive message.

Next, the cloud management service has the data or intended traffic intended for the unresponsive device routed to its peer device (block 404). Finally, sending the data or intended traffic from the peer device to the unresponsive device (block 405).

Figure 5:
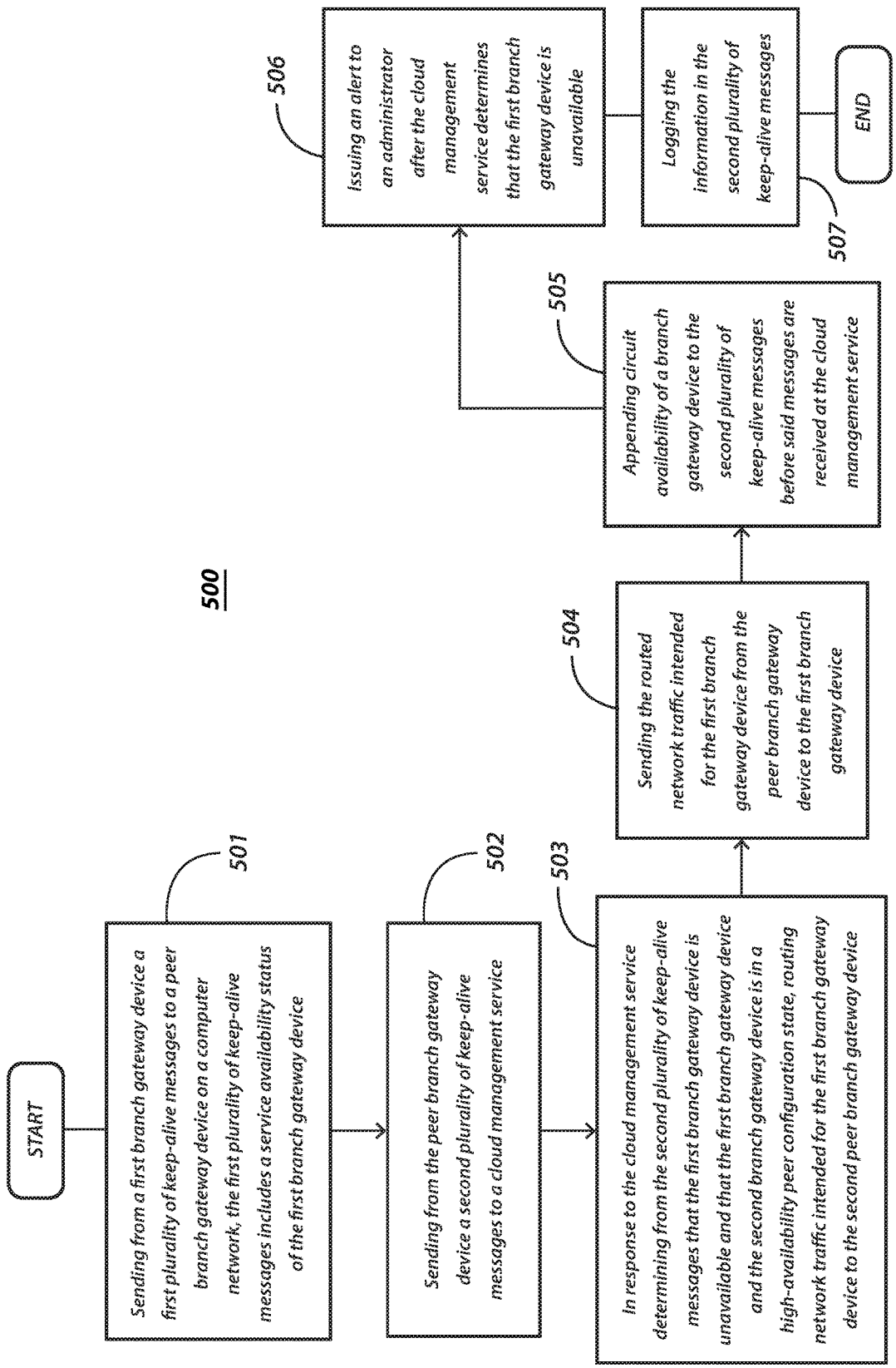
FIG. 5 is a flowchart of yet another method for determining branch gateway device circuit and device availability in a computer network.

FIG. 5 is a flowchart 500 of yet another method for determining branch gateway circuit and device availability in a computer network. The method described in flowchart 500 can be executed by a computing device having one or more processors that execute instructions stored in memory.

The method begins with executing instructions to send a first plurality of keep-alive messages from a first branch gateway device to a peer branch gateway device on a computer network. The first plurality of keep-alive messages includes a service availability status of the first branch gateway device (block 501). As such, the first branch gateway device advertises its service availability status to the peer branch gateway device via the first plurality of keep-alive messages.

Next, executing instructions to send from the peer branch gateway device a second plurality of keep-alive messages to a cloud management service. In some implementations, the second plurality of keep-alive messages includes a service availability status of both the first branch gateway device and the peer branch gateway device (block 502).

Further, executing instructions such that in response to the cloud management service determining from the second plurality of keep-alive messages that the first branch gateway device is unavailable and that the first branch gateway device and the second branch gateway device is in a high-availability peer configuration state, routing network traffic intended for the first branch gateway device to the second peer branch gateway device (block 503).

Next, executing instructions to send the routed network traffic intended for the first branch gateway device from the peer branch gateway device to the first branch gateway device (block 504). Further, executing instructions to append circuit availability of a branch gateway device to the second plurality of keep-alive messages before the keep-alive messages are received at the cloud management service (block 505).

In addition, executing instructions to issue an alert to an administrator after the cloud management service determines from a keep-alive message that the first branch gateway device is unavailable (block 506). Finally, executing instructions for the cloud management service to log the information in the second plurality of keep-alive messages (block 507).

Accordingly, the present disclosure can be employed to accurately determine branch gateway circuit and device availability when branch gateway devices are configured in a redundancy peer state and managed by a cloud management service.

As will be appreciated by one skilled in the art, the present disclosure may be embodied as a system, method or computer program product. Accordingly, the present disclosure may take the form of hardware, a software implementation (including firmware, resident software, micro-code, etc.) stored in a storage device, or an implementation combining software and hardware aspects that may all generally be referred to herein as a "circuit," "module," or "system." Furthermore, the present disclosure may take the form of a computer program product embodied in any storage device having computer readable program code embodied in the medium. A storage device for storing computer readable program code does not encompass a signal propagation media such as copper cable, optical fiber or wireless transmission media.

Any combination of one or more computer-readable storage device may be utilized. The computer-readable storage device may be, for example but not limited to, an electronic, magnetic, optical, electromagnetic, infrared, or semiconductor system, apparatus, or device. More specific examples (a non-exhaustive list) of the computer-readable storage device may include the following: a portable computer diskette, a hard disk, a random access memory (RAM), a read-only memory (ROM), an erasable programmable read-only memory (EPROM or flash memory), a portable compact disc read-only memory (CDROM), an optical storage device, or a magnetic storage device processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object-oriented programming language such as Java™, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts exhibited in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act exhibited in the flowchart and/or block diagram block or blocks.

The processor includes an arithmetic logic unit, a microprocessor, a general purpose controller or some other processor array to perform computations and provide electronic display signals to a display device. Processor processes data signals and may include various computing architectures including a complex instruction set computer (CISC) architecture, a reduced instruction set computer (RISC) architecture, or an architecture implementing a combination of instruction sets. The present disclosure includes a single processor, multiple processors may be included. Other processors, operating systems, sensors, displays and physical configurations are possible. In some implementations, the processor includes a networking processor core that is capable of processing network data traffic.

The memory stores instructions and/or data that may be executed by the processor. The instructions and/or data may include code for performing the techniques described herein. The memory may be a dynamic random access memory (DRAM) device, a static random access memory (SRAM) device, flash memory or some other memory device. In some implementations, the memory also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The computer program instructions may also be loaded onto a computer or other programmable data processing apparatus, such as but not limited to an expansion card such as a computer expansion card (e.g., memory expansion card or personal computer card) to cause a series of operational steps to be performed on the computer or other programmable apparatus to produce a computer implemented process such that the instructions which execute on the computer or other programmable apparatus provide processes for implementing the functions/acts exhibited in the flowchart and/or block diagram block or blocks.

In the foregoing description, for the purposes of illustration, methods were described in a particular order. It should be appreciated that in alternate implementations, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

While illustrative implementations of the application have been described in detail herein, it is to be understood that the inventive concepts may be otherwise variously embodied and employed, and that the appended claims are intended to be construed to include such variations, except as limited by the prior art.

Reference throughout this specification to "one implementation" or "an implementation" means that a particular feature, structure, or characteristic described in connection with the implementation is included in at least one implementation of the present disclosure. Thus, the appearances of the phrases "in one implementation" or "in some implementations" in various places throughout this specification are not necessarily all referring to the same implementation. Furthermore, the particular features, structures, or characteristics may be combined in any suitable manner in one or more implementations.

In the foregoing specification, a detailed description has been given with reference to specific example implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation and other exemplarily language does not necessarily refer to the same implementation or the same example, but may refer to different and distinct implementations, as well as potentially the same implementation.

What is claimed is:

1. A method to determine branch gateway device availability in a computer network, comprising:
receiving status messages from a plurality of branch gateway devices on a computer network;
in response to not receiving an expected status message from an unresponsive branch gateway device on the computer network, determining from the status messages whether the unresponsive device is in a peer configuration state;
in response to determining that the unresponsive branch gateway device is in the peer configuration state, determining at least one peer branch gateway device that is in the peer configuration state with the unresponsive branch gateway device; and
routing network traffic intended for the unresponsive branch gateway device to the at least one peer branch gateway device.

2. The method of claim 1, further comprising sending the network traffic from the at least one peer branch gateway device to the unresponsive branch gateway device.

3. The method of claim 1, wherein determining whether the unresponsive branch gateway device is in the peer configuration state further comprises determining physical uplink availability of the unresponsive branch gateway device.

4. The method of claim 1, wherein each of the status messages comprise infrastructure availability of a branch gateway device on the computer network.

5. The method of claim 1, wherein at least one of the status messages comprises information regarding virtual uplink availability.

6. The method of claim 1, wherein the status messages are received at a cloud management service.

7. The method of claim 1, wherein the peer configuration state is a high-availability peer configuration state.

8. The method of claim 1, wherein each of the plurality of branch gateway devices on the computer network is configured to send status messages to a cloud management service at a pre-determined rate.

9. The method of claim 8, wherein the unresponsive branch gateway device advertises device availability to the at least one peer device that the unresponsive branch gateway device is peer configured therewith.

10. A non-transitory computer readable medium including instructions stored in memory to determine branch gateway device availability which, when executed by one or more processors, cause the one or more processors to:
send from a first branch gateway device to a peer branch gateway device on a computer network a first plurality of keep-alive messages, the first plurality of keep-alive messages including a service availability status of the first branch gateway device;
send from the peer branch gateway device to a cloud management service a second plurality of keep-alive messages, the second plurality of keep-alive messages including a service availability status of both the first branch gateway device and the peer branch gateway device;
determine from the second plurality of keep-alive messages whether the first branch gateway device is unavailable and whether the first branch gateway device and the peer branch gateway device is in a high-availability peer configuration state;
in response to the cloud management service determining that the first branch gateway device is unavailable and that the first branch gateway device and the peer branch gateway device is in a high-availability peer configuration state, route network traffic intended for the first branch gateway device to the peer branch gateway device; and
send the routed network traffic intended for the first branch gateway device from the peer branch gateway device to the first branch gateway device.

11. The non-transitory computer readable medium of claim 10, further including instructions stored in the memory to issue an alert to an administrator after the cloud management service determines that the first branch gateway device is unavailable.

12. The non-transitory computer readable medium of claim 10, further including instructions stored in the memory when executed to append circuit availability of the peer branch gateway device to the second plurality of keep-alive messages before the second plurality of keep-alive messages are received at the cloud management service.

13. The non-transitory computer readable medium of claim 10, further including instructions stored in the memory when executed by the one or more processors to log the information in the second plurality of keep-alive messages.

14. The non-transitory computer readable medium of claim 10, wherein the peer branch gateway device sends the second plurality of keep-alive messages to a cloud management service at a pre-determined rate.

15. The non-transitory computer readable medium of claim 10, wherein the first and second keep-alive messages include uplink circuit availability associated with a branch gateway device.

16. A computer network topology, comprising:
a cloud management service;
a first branch gateway, wherein the first branch gateway has a first branch gateway device coupled thereto, the first branch gateway device is in a high-availability peer enabled configuration state with a second branch gateway device, and the first and second branch gateway devices are configured to send and receive first keep-alive messages to each other; and
a second branch gateway, wherein the second branch gateway has the second branch gateway device coupled thereto, and the second branch gateway device is configured to transmit second keep-alive messages to the cloud management service, wherein the second keep-alive messages include a service availability of both the first and second branch gateway devices,
wherein the cloud management service is configured to:
determine from the second keep-alive messages whether the first branch gateway device is unavailable and whether the first branch gateway device and the second branch gateway device is in a high-availability peer configuration state; and
in response to determining that the first branch gateway device is unavailable and that the first branch gateway device and the second branch gateway device is in a high-availability peer configuration state, route network traffic intended for the first branch gateway device to the second branch gateway device.

17. The computer network topology of claim 16, wherein the first keep-alive messages include information regarding the virtual circuit availability on the first branch gateway device and the virtual circuit availability of the second branch gateway device.

18. The computer network topology of claim 16, wherein the first branch gateway device is coupled to at least one of a switch, router, or client device.

19. The computer network topology of claim 16, wherein the first branch gateway device is in a first computer network and the second branch gateway device is in a second computer network.

\* \* \* \* \*